United States Patent

[11] 3,595,996

[72] Inventor Peter J. Unger
Beaverton, Oreg.

[21] Appl. No. 781,764
[22] Filed Dec. 6, 1968
[45] Patented July 27, 1971
[73] Assignee Textronix, Inc.
Beaverton, Oreg.

[54] CHARGE IMAGE STORAGE METHOD AND APPARATUS
14 Claims, 5 Drawing Figs.

[52] U.S. Cl. .......... 178/6.8, 315/12
[51] Int. Cl. .......... H01j 29/39
[50] Field of Search .......... 178/6.8 CR, 7.7; 315/12; 313/68

[56] References Cited

UNITED STATES PATENTS

| | | | |
|---|---|---|---|
| 2,403,562 | 7/1946 | Smith | 178/5 |
| 2,696,523 | 12/1954 | Theile | 178/6.8 |
| 3,046,331 | 7/1962 | Gebel | 178/5.6 X |
| 3,293,474 | 12/1966 | Gibson, Jr. | 313/92 X |
| 3,389,219 | 6/1968 | Stetten | 178/6.8 |
| 3,404,308 | 10/1968 | Burns | 315/12 |
| 3,499,979 | 3/1970 | Fiorletta et al. | 178/6.8 |
| 3,275,747 | 9/1966 | Hall | 178/6.8 |

OTHER REFERENCES

IBM Technical Disclosure Bulletin, Vol. 6, No. 1, June 1963, pp. 109— 110, " Flicker-Free Display Generation" Copy in 178-6.8 CR

*Primary Examiner*—Richard Murray
*Assistant Examiner*—Richard K. Eckert, Jr.
*Attorney*—Buckhorn, Blore, Klarquist and Sparkman

ABSTRACT: A cathode-ray storage tube is employed for bistably storing a charge image corresponding to input signal information and for providing an electrical readout corresponding to such information. For purposes of electrical readout, the tube's electron beam is caused to scan, raster fashion, over the stored image. An electrical signal corresponding to the stored image is produced on the storage tube's target electrode. The input signal applied to the apparatus is sampled at times during the retrace interval of horizontal raster lines, substantially concurrently with the occurrence of the input signal.

PETER J. UNGER
*INVENTOR*

BY

*BUCKHORN, BLORE, KLARQUIST & SPARKMAN*
*ATTORNEYS*

PETER J. UNGER
*INVENTOR*

*BY*

*BUCKHORN, BLORE, KLARQUIST & SPARKMAN*
*ATTORNEYS*

CHARGE IMAGE STORAGE METHOD AND APPARATUS

BACKGROUND OF THE INVENTION

A scan conversion apparatus, as the term is used in connection with the present invention, is an apparatus for duplicating a stored charge image at one or more remote locations. In particular, a cathode-ray storage tube storing a charge image corresponding to input information is scanned by a television-type raster for "reading" the stored image, and the image is then duplicated, raster fashion, on one or more television monitors. The scan conversion system has the advantage of being able to employ relatively economical television monitors which may not themselves be responsive to an input signal of appreciable bandwidth. The storage tube and attendant circuitry are adapted for accurately portraying the input signal. Then plural television monitors duplicate the portrayal at their regular operation rate. The monitors may each employ cathode-ray tubes or larger diameter than the storage tube.

In a scan conversion system using a single gun scan conversion storage tube, the gun must be used for both writing of the stored image on the tube's storage target and for reading the target. In most applications the frequency and duration of the writing sweep are completely indeterminate and often random. A reading raster, on the other hand, is usually at fixed rates such as conventional television rates. If a time-sharing system is used and is controlled either wholly or in part by the writing sweep, several problems arise, such as beats between the writing frequency and either the vertical or horizontal scan frequency. Also, a writing sweep of long duration intrudes on reading time. These problems may be avoided by controlling time sharing with the reading raster. Writing can then take place during reading retrace times.

Prior attempts have been made to write a storage image during a vertical retrace interval, that is, between the tracing of successive television rasters. However, the vertical retrace periods occur infrequently enough so that they may be incompatible with the incoming signal. That is, the incoming signal may not conveniently occur during vertical retrace periods and additional storing means may be necessary. Also, the input signal may have a duration longer than the retrace interval and may extend over several retrace intervals. Sampling of the input signal is possible during such vertical retrace intervals, but leads to a presentation with relatively wide gaps wherein portions of the input signal may be missed entirely.

SUMMARY OF THE INVENTION

According to the present invention, a cathode-ray tube is employed for bistably storing a charge image corresponding to input information. The charge image is scanned, raster fashion, by an electron beam and means are coupled to the cathode-ray tube storage target for detecting a readout signal corresponding to the charge image. The input signal is sampled at sampling times corresponding to horizontal retrace intervals, that is, the intervals between raster lines, and is employed at such times for writing the image which is stored. The image is written as information is received, i.e. on a "real time" basis. This same procedure is followed not only throughout the horizontal retrace intervals, but also during the vertical retrace intervals. The result is a stored image which is easily scanned and transmitted to remote monitors.

It is therefore an object of the present invention to provide a charge image storage method and apparatus employing a storage tube wherein an electron beam both produces a charge image and provides readout for the same, wherein an improved presentation of the input information is afforded.

It is another object of the present invention to provide a charge image storage method and apparatus wherein information is stored on a cathode-ray storage tube target as information is received without interference between reading and writing functions in the storage tube.

It is a further object of the present invention to provide an improved scan conversion system for providing one or more reproductions of input information with relatively economical and simplified equipment.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
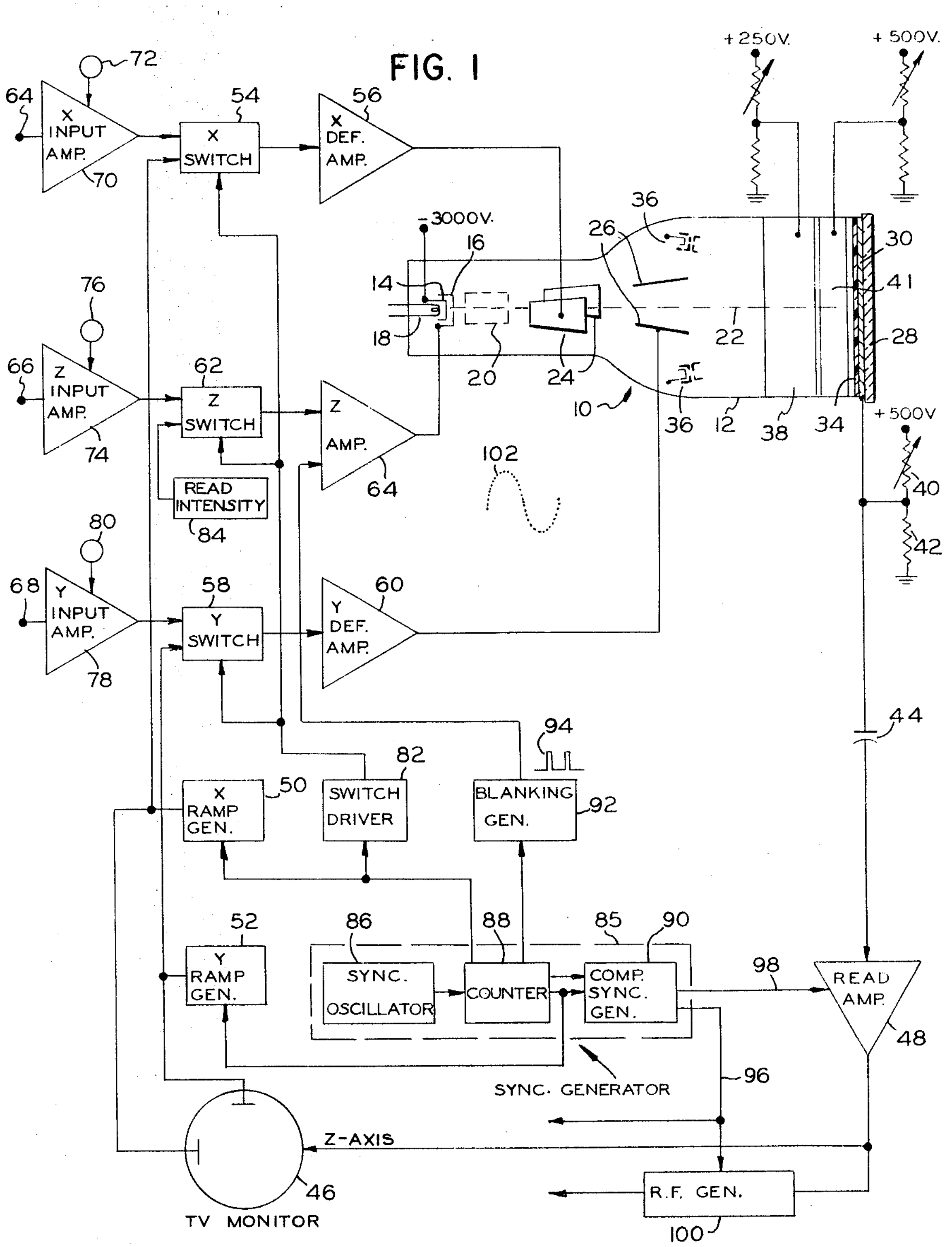
FIG. 1 is a block diagram of a charge image storage apparatus according to the present invention.

Referring to the drawings, and particularly to FIG. 1, the apparatus according to the present invention includes a storage tube 10. The storage tube comprises an envelope 12 having a principal electron gun including a cathode 14 connected to a high negative source, a control grid 16, a filament 18, and a focusing and accelerating structure 20. The electron beam 22 produced by the principal electron gun is deflected horizontally by means of horizontal deflection plates 24 and vertically by means of vertical deflection plates 26. The beam 22 is in general directed towards a target disposed on the inner side of an end plate 28, suitably formed of glass, such storage target including a desirably transparent storage target electrode 30 which may comprise a thin conductive layer such as tin oxide. The electrode is coated over its inner surface by a secondary emissive dielectric layer 34, desirably formed of phosphor material. This layer is advantageously an integral semicontinuous phosphor layer which has a sufficiently porous structure to enable transmission of secondary electrons through such layer for collection by the conductive target electrode 30. Alternatively, portions of the target electrode areas may extend through portions of the phosphor layer to provide a raised collector configuration. When a phosphor dielectric and a glass end plate are employed, the tube is of the direct viewing type. That is, an image stored is visible from the end of the tube.

The storage tube 10 is additionally provided with one or more flood-type electron guns 36 which are supported inside envelope 12 adjacent the ends of vertical deflection plates 26 closest to the target. Electrons emitted from the flood guns diverge into a wide beam which is substantially uniformly distributed towards phosphor layer 34. A plurality of electrodes are also provided on the inner surface of envelope 12 beyond the flood guns. A first electrode 38, connected to the midpoint of a voltage divider disposed between a 250 volts and ground in the specific circuit, acts to provide a more uniform electric field for collimating electrons. A second electrode 41 near the target end of the tube is also connected to the midpoint of a voltage divider between a positive voltage, e.g. 500 volts, and ground and acts to collimate electrons as well as possibly to collect some secondary electrons.

A storage tube and target of the foregoing type is set forth and claimed in Robert H. Anderson, U.S. Pat. No. 3,293,473, granted Dec. 20, 1966, entitled, "Thin, Porous Storage Phosphor Layer," and assigned to the assignee of the present invention. This storage target may also be of the raised collector type as set forth and claimed in the copending application of Roger A. Frankland, entitled, "Cathode Ray Storage Tube and Method of Manufacture," filed Feb. 28, 1967, Ser. No.

619,904, now U.S. Pat. No. 3,531,675, which is also assigned to the assignee of the present invention.

During writing operation of the tube, the tube potentials are such that beam 22 has a relatively high velocity and is capable of producing secondary electrons when it strikes phosphor layer 34. Secondary electrons are then suitably collected by the target electrode 30, in which case an elemental area of target can be driven positive or "written" as the result of secondary emission. A written area is retained at a relatively positive potential after beam 22 has passed such elemental area because of the action of flood guns 36. Flood guns 36 produce relatively low velocity electrons which strike the target but which ordinarily have insufficient velocity for writing information. When electrons from flood guns 36 strike areas of the target upon which a positive charge has not been written, these flood electrons tend to maintain such areas at the relatively negative potential of the flood guns. This is one stable potential level of the target. However, the flood gun electrons are attracted by positive elemental areas and obtain a high velocity with respect to these areas for producing continued secondary emission therefrom. Therefore these last mentioned areas are maintained relatively positive or near the potential of the target electrode. This latter potential comprises the second stable potential level of the target. The target thus has bistable properties and is capable of retaining information written thereon, with the flood beam of electrons driving target areas toward one of two stable potentials depending upon the information written thereon with beam 22. A waveform or the like, once written on the target dielectric, can be retained almost indefinitely by the storing action of the flood guns.

Figure 2:
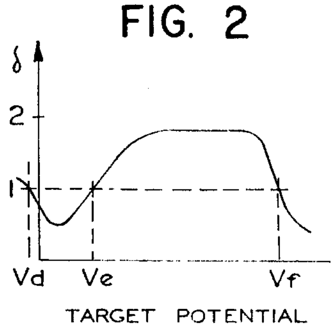
FIG. 2 is a plot of storage tube target secondary emission ratio versus target potential for the FIG. 1 charge image storage apparatus.

The manner in which the storage tube operates will be further described with reference to FIG. 2, a plot of secondary emission versus target potential for the side of the target bombarded by electron beam 22. Examining this curve, we see two points at which the secondary emission ratio for the target is equal to one. At $V_d$, $\delta$ equals one, because the target, and specifically the inside surface of dielectric layer 34, has collected sufficient electrons to charge a few tenths of a volt negative with respect to the flood gun cathode thereby rejecting all electrons. At $V_e$, the accelerating potential is high enough for the material on the target dielectric surface to emit secondary electrons, and at $V_f$ the target dielectric has charged a few volts higher than the collector or target electrode 30, and all secondary electrons in excess of primary electrons are returned to the target. $V_d$ and $V_f$ are the stable potentials. If the target begins to rise above $V_d$, the target collects electrons, the secondary emission ratio being less than one, and the target dielectric charges negatively restoring the target dielectric to $V_d$. If we bombard the target with a high energy electron beam, and allow it to charge by secondary emission to any potential just under $V_e$, it will return under the action of the flood guns to $V_d$. However, if we allow it to charge more positive than $V_e$, due to the action of beam 22, the secondary emission caused by the flood electrons will discharge the target dielectric positively until it reaches $V_f$. If it passes $V_f$, the secondary emission ration becomes less than one and any electrons arriving attempt to charge the target negatively. $V_e$ is described as the first crossover voltage of the secondary emission characteristic, or the minimum voltage necessary for storage. The voltage level at $V_e$ is also the writing threshold level, above which electron beam 22 must bring an elemental area of the target in order for the flood beams to take over and retain such elemental area at a stable positive potential substantially equal to the potential of electrode 30, that is, the positive stable potential level of the target. All areas which have not been raised above this writing threshold by beam 22 will be retained by the flood guns to a voltage close to the normal potential of the flood gun cathodes, i.e., ground, or the stable negative potential level for the target.

Tube 10 also provides electrical readout at target electrode 30 when the target is scanned by electron beam 22 in a reading or nonwriting mode. Target electrode 30 is connected to a voltage divider including variable resistor 40 and load resistor 42 disposed, e.g. between +500 volts and ground, with the target electrode being connected to the midpoint of the voltage divider. The target electrode is also connected through an AC coupling capacitor 44 and read amplifier 48 to control the Z-axis input of a television monitor tube 46. An electrical readout current will be produced on the target electrode 30 as the charge image stored on the dielectric layer is scanned by electron beam 22. The beam 22 has an intensity and scanning rate for reading such that bistable information is not stored. The readout current is converted into a readout voltage across load resistor 42 and is transmitted to the Z-axis input of the monitor tube in accordance with the charge image. Variable resistor 40 may be employed for producing erasure of a stored image on the storage tube. When erasure is desired, the resistance of resistor 40 is first decreased whereby the storage target is "faded positive". Then, the resistance is increased again until the target electrode 30 is more negative than the writing retention threshold voltage, the minimum voltage required for storage, before the target electrode is returned to a normal range within which storage can occur. This procedure first writes the whole target uniformly, then erases the whole target prior to the reception of input information for a further stored image. Of course, an erase generator for providing an equivalent erase signal can be employed instead of a variable resistance.

The horizontal and vertical plates of the monitor tube are suitably connected to a raster generator comprising X-ramp generator 50 and Y-ramp generator 52, which also produce a raster scan of electron beam 22 in tube 10 in the reading mode, for synchronous operation of the tubes. Thus during read operation, X-ramp generator 50 is connected to the X-deflection plates 24 of tube 10 via switch 54 driving X-deflection amplifier 56, and Y-ramp generator 58 is connected to Y-deflection plates 26 via switch 58 driving Y-deflection amplifier 60. A raster signal in the form for example, of a 60 cycle per second sawtooth may be applied to the respective vertical tube plates from Y-ramp generator 52, while a horizontal raster signal in the form of a 15,750 cycle per second sawtooth may be applied to the respective horizontal deflection plates from X-ramp generator 50. The resultant raster comprises a plurality of substantially straight, e.g. horizontal, lines with a retrace interval between each line and the next.

In order to prevent the beam from causing the raster pattern to be stored on the storage target during electrical readout, the control grid 16 of the storage tube is switched to a read intensity level via Z-switch 62 and Z-amplifier 65 during reading. This reduces the current density on the reading beam below that employed for the beam during writing, so that the reading beam does not produce a stored image. Instead, the reading beam scans the charge images provided on the dielectric layer 34 to produce a readout signal on target electrode 30 which corresponds to such charge images without changing these images. Thus, when the reading beam strikes "unwritten" or background areas of the dielectric, a positive readout voltage is produced across load resistor 42. However, when the reading beam strikes a "written" area of the target, it produces the negative-going voltage pulse across the load resistor. These changes cause the identical image to be provided visibly by TV monitor 46.

Figure 4:
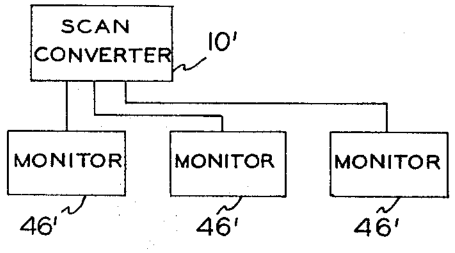
FIG. 4 is a block diagram illustrating a scan conversion system employing a number of monitors.

This general operation as above described for image reproduction on a monitor or the like is known as scan conversion. The storage tube and its associated circuitry may be such that the input applied to the cathode-ray tube 10 for storage can be one requiring fast response. Transient signals and the like may be written and stored on the storage tube, and then these same signals can be duplicated more slowly on one or more TV monitors. Then only the storage tube and its circuitry need have superior response characteristics. However, the storage tube 10 need not be large nor need it even be of the direct viewing type. The TV monitors, on the other hand, may be more easily provided with larger screens. A raster generator comprising X-ramp generator 50 and Y-ramp generator 52 provide the raster scan within the capabilities of the TV monitor or monitors. A scan conversion system is illustrated in FIG. 4, and includes a scan converter storage tube 10' operating monitors 46', shown in block diagram form.

According to the present invention, the input signal which writes a charge image on the storage dielectric layer 34 of storage tube 10 is sampled at sampling times corresponding to the horizontal retrace intervals of said raster. The input signal produces the charge image substantially as the input signal is received, with the samples thereof directing the electron beam 22 to write the charge image corresponding to sampled portions of the input signal. Since the signal produces the charge image as it is received, it is recorded on the cathode-ray storage tube 10 on a "real time" basis, and need not be stored elsewhere for later writing at a convenient time on the storage tube target.

Referring again to FIG. 1, an input signal to be stored is received via input terminals 64, 66 and 68. Terminal 64 is connected to the input of X-input amplifier 70, the latter being provided with a horizontal positioning control 72. Similarly, terminal 66 is connected to the input of Z-input amplifier 74 provided with a write intensity control 76, while input terminal 68 is connected to the input of Y-input amplifier 78 including a vertical positioning control 80. In the case of a waveform to be stored on storage tube 10, the input on terminal 64 would normally comprise a horizontal sweep, while the input at terminal 68 represents the amplitude of the waveform. The terminal 66 input provides intensity control of the written information. During writing, the intensity input must be such that electron beam 22 is controlled within its appropriate writing range of intensities.

The output of amplifier 70 comprises one input of X-switch 54. Switch 54 connects the input of X-deflection amplifier 56 either to the output of the amplifier 70, or alternatively to X-ramp generator 50, under the control of switch driver 82. Similarly, the input of Z-amplifier 65, providing the drive for grid 16, is alternatively connected by switch 65 either to the output of amplifier 74 or the output of read intensity supply 84. Switch 62 is likewise controlled by switch driver 82. Also, the input of Y-deflection amplifier 60 is switched by switch 58 between the output of Y-amplifier 78 and the output of Y-ramp generator 52 under the control of switch driver 82.

Switch driver 82, as well as the raster generator comprising X-ramp generator 50 and Y-ramp generator 52, are controlled by sync generator 85, the latter comprising a sync oscillator 86, a counter 88, and a composite sync generator 90. Sync oscillator 86 provides a regular clock signal which is counted down or divided by counter 88 to provide the proper synchronization signals to X-ramp generator 50 and Y-ramp generator 52 for producing a raster on TV monitor 46, and on the storage target of storage tube 10 during reading operations. Counter 88 also provides an input signal to blanking generator 92 in synchronism with the signal provided X-ramp generator 50, but prior to such signal so that a blanking signal 94 may be produced during switching, as hereinafter more fully indicated. The counter 88 provides both X and Y synchronization signals to a composite sync generator 90 which generates a composite television sync signal on line 96, as well as a read amplifier blanking signal on line 98 at a time corresponding to horizontal or vertical, that X and Y, synchronization pulses. The composite sync signal on line 96 may be delivered to a TV monitor in place of a direct ramp from X-ramp generator 50 and Y-ramp generator 52, inasmuch as conventional TV monitors are adapted to receive a television signal and derive their own ramps. Composite sync signal at line 96 is also suitably delivered to an RF generator 100 in combination with the video signal from read amplifier 48, with video and synchronization being combined in RF generator 100 to provide an RF output capable of operating remote television receivers. Other arrangements for transmitting both signal information and synchronizing information to the remote TV monitor are, of course, possible.

X-ramp generator 50, which controls the generation of horizontal raster lines, and switch driver 82 are operated synchronously. Switch driver 82 functions to sample the input signal as provided at terminals 64, 66 and 68 at times corresponding to horizontal retrace intervals, that is, the intervals between raster lines. These signals are then provided respectively to amplifiers 56, 65 and 60 by operating switches 54, 62 and 58. During the remainder of the time, switch driver 82 causes the switches 54 and 58 to connect X-ramp generator 50 and Y-ramp generator 52, respectively, for causing raster deflection in cathode ray tube 10. Also, Z-switch is operated so that read intensity supply 84 controls the bias of grid 16 for reducing the intensity of electron beam 22 below the writing level during the time when an input signal is not written.

Waveform 102 is an illustration of a small sine wave written on the storage tube target by the sampling method and apparatus according to the present invention. it is seen the sine wave may be formed of a plurality of dots or samples are taken often enough, that is during each horizontal retrace interval, so that the spaces between samples do not interfere with the faithful signal presentation by the storage tube. The waveform samples may, of course, comprise dashes or longer waveform portions rather than dots. The input signal is desirably repetitive.

It should be noted that the sampling thus produced by switch driver 82 occurs not only during horizontal retrace periods, but continues at the same rate during vertical retrace periods. This type of presentation is more satisfactory than one adapted to sample at both retrace intervals because the latter would result in a presentation comprising a number of short samples followed by a long sample, etc. The present system continues to sample at the same sampling rate throughout.

Blanking generator 92 is employed for blanking the electron beam 22 during switching of switches 54, 62, and 58 at the start and end of each retrace period between horizontal raster lines. Referring to the waveform diagram of FIG. 3, the X-ramp produced by X-ramp generator 50 is illustrated at 104 while the retrace is indicated at 106. The switching signal from switch driver 82 is illustrated in timed relation with the retrace at 108, thus corresponding to the X-ramp retrace period. Just prior to the conclusion of the X-ramp, blanking generator 92 produces, in response to a signal from counter 88 the first portion 94*a* of the blanking signal. This blanking signal deenergizes Z-amplifier 65 causing bias to be applied to storage tube control grid 16 such that electron beam 22 is blanked. Blanking the electron beam at this time prevents the beam from being affected by a switching transient at the time of sampling. Then, at the conclusion of sampling signal 108 a second portion 94*b* of the blanking pulse similarly disables Z amplifier 64 such that switching transients are again blocked out and do not produce distortion in the writing of the stored image corresponding to the input signal.

Figure 5:
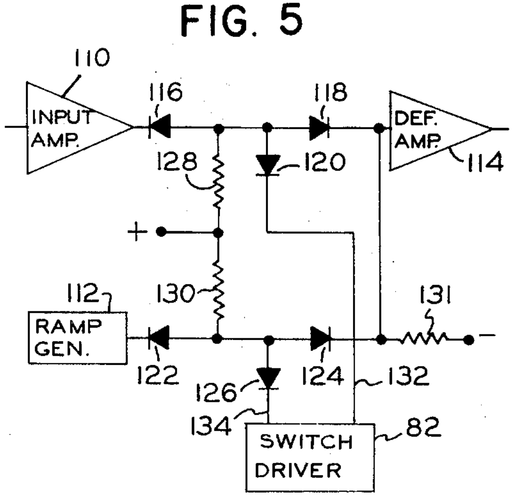
FIG. 5 is a schematic diagram of switching means employed according to the present invention.

A circuit suitably employed for X-switch 54, Z-switch 62, or Y-switch 58 is illustrated in FIG. 5. Here, input amplifier 110 corresponds to input amplifier 70, 74, or 78 in FIG. 1, while ramp generator 112 corresponds to the X-ramp generator 50 the Y-ramp generator 52, or read intensity supply 84. Also, deflection amplifier 114 corresponds to X-deflection amplifier 56, Y-deflection amplifier 60, or Z-amplifier 65 in FIG. 1. The switch in FIG. 5 comprises first and second reversely poled diodes 116 and 118 connected in series between the output of amplifier 110 and the input of amplifier 114. The anodes of the respective diodes 116 and 118 are connected together, while the same point is connected to the anode of diode 120, the cathode of which is connected to switch driver 82.

Figure 3:
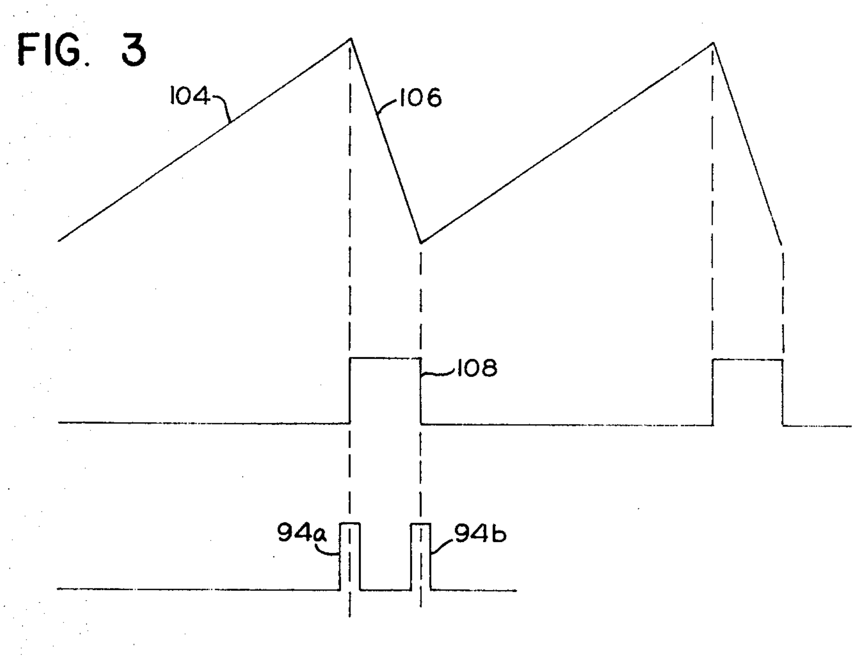
FIG. 3 is a charge of waveforms illustrating operation of the FIG. 1 apparatus.

The switch also includes diodes 122 and 124 reversely poled and connected in series between ramp generator 112 and the input of deflection of amplifier 114. The anodes of diodes 122 and 124 are connected together and also to the anode of a diode 126, the cathode of which is connected to switch driver 82. The junction of diodes 116, 118 and 120 is coupled through resistor 128 to a positive voltage source, while the junction between diodes 122, 124 and 126 is similarly connected through a resistor 130 to the same positive source. A resistor 131 is connected between the input of amplifier 114 and a negative voltage. The positive-going voltage waveform, 108 in FIG. 3, is derived from output lead 132 of the switch driver while the inverse or complement thereof is produced at output lead 134. That is, the signal at lead 134 is normally relatively positive, and goes negative at the same time that waveform 108 goes positive. At the time when the X-ramp 104 is present, lead 134 is thus relatively positive and lead 132 is relatively negative. As a consequence, diode 122 conducts current through resistor 128 from the positive source, while diode 126 does not conduct. Thus the junction between diodes 116 and 118 is "pulled down" so the output of amplifier 110 does not reach deflection amplifier 114. However, the ramp generator 112 output will appear at the junction of diodes 122, 124 and 126 since diodes 122 and 124 both conduct from the positive source. Therefore, the signal from ramp generator 112 is applied to the input of deflection amplifier 114.

At the start of a horizontal retrace interval, lead 134 becomes relatively negative, pulling down the junction between diode 122, 124 and 126, while lead 132 becomes relatively positive, disconnecting diode 120. As a consequence, the output of input amplifier 110 is connected to the input of deflection amplifier 114 so that sampling may take place.

It is understood that the above described embodiment is simply illustrative of the application of principles of the invention. Numerous other arrangements may be readily devised by those skilled in the art which will embody the principles of the invention and fall within the spirit and scope thereof.

I claim:

1. Charge image storage apparatus comprising:

a cathode-ray storage tube including a target provided with a storage dielectric upon which charge images are stored by means of an electron beam generated within said tube, means for scanning said electron beam within said tube in a repetitive raster pattern, such pattern comprising a plurality of substantially straight lines with a retrace interval between each line and the next, means coupled to said target for detecting a readout signal corresponding to a said charge image as said target is scanned in said repetitive raster pattern, and means for sampling an input signal and for directing said electron beam in said tube to write for storage the said charge image corresponding to sampled portions of said input signal at sampling times corresponding to said retrace intervals as said input signal is received.

2. The apparatus according to claim 1 further including monitor means including a cathode-ray tube, said monitor means receiving said readout signal for producing a representation of said charge image upon the cathode-ray tube of said monitor means, said monitor means including means for synchronizing the operation of said monitor means' cathode-ray tube with the scanning of said storage tube in repetitive raster pattern.

3. The apparatus according to claim 1 wherein said cathode-ray storage tube is provided with a transparent end plate adjacent said storage dielectric for supporting said storage dielectric, said storage dielectric comprising a phosphor layer for storing and producing a visible image through said transparent end plate.

4. The apparatus according to claim 1 wherein said means for sampling comprises a plurality of switching means coupled to deflection means of said cathode-ray storage tube, and means for operating said switching means to couple an input signal to said deflection means in response to timing of said retrace interval between successive raster lines.

5. The apparatus of claim 4 further including blanking means for disabling an electron beam generated within said storage tube as said switching means operate to couple said input signal to said deflection means.

6. The apparatus according to claim 4 including a raster generator, and wherein said switching means normally couples said raster generator to the deflection means of said storage tube.

7. The apparatus according to claim 6 including a sync generator for synchronously operating said raster generator and said means for operating said switching means.

8. Charge image storage apparatus comprising:

a bistable cathode-ray storage tube including a target having a support member of insulative material, a target electrode layer overlaying said support member, and a storage dielectric of phosphor supported at least partially over said target electrode, said tube further including an electron beam means for writing and reading information on said phosphor with an electron beam, and a flood beam means directed towards said phosphor for establishing bistable storage properties thereof, said tube also including orthogonal deflection means for deflecting said beam, a second cathode-ray tube coupled to said electrode layer of said storage tube for changing the intensity of the electron beam in said second cathode-ray tube in response to signal information from said electrode layer in said storage tube, raster generator means coupled to said second cathode-ray tube for normally deflecting the electron beam thereof in a raster pattern comprising a plurality of substantially straight lines with a retrace interval between each line and the next, means normally coupling said raster generator means to the deflection means of said cathode-ray storage tube for deflecting the electron beam thereof in a corresponding raster pattern, means for receiving an input signal, and means for switching said deflection means of said cathode-ray storage tube to receive said input signal and deflect the beam of said storage tube in accordance therewith during said retrace intervals between each raster line and the next, and for then returning said deflection means to the control of said raster generator.

9. The apparatus according to claim 8 wherein said switching means also operates to reduce the intensity of the electron beam in said storage tube during normal raster scanning thereof.

10. The apparatus according to claim 8 including a sync generator for synchronizing the operation of said raster generator means and said switching means so that said switching means operates to couple said input signal during the retrace interval between each raster line and the next.

11. The apparatus according to claim 9 wherein said sync generator operates said switching means at the same sampling rate between each raster line and the next and between successive rasters to produce a substantially uniform sampling.

12. The apparatus according to claim 10 including a blanking generator for disabling the electron beam in said cathode-ray storage tube as said switching means couples said input signal to operate said deflection means, and as said switching means returns said deflection means for control by said raster generator means, in order to inhibit switching transients.

13. The method of operating a cathode-ray storage tube for reproduction of the charge image thereupon at a remote cathode ray tube comprising:

normally scanning the electron beam of said storage tube in raster fashion for detecting and transmitting information corresponding to the stored image from said storage tube to the remote cathode-ray tube, and normally scanning the electron beam of said remote cathode-ray tube in synchronism with the beam of said storage tube, and writing charge image information on said cathode-ray storage tube during retrace intervals of said raster scan between each line and the next, including sampling input information at such times and providing such information for controlling the electron beam of said storage tube.

14. The method according to claim 13 including blanking the beam of the cathode-ray storage tube at the start and at the conclusion of the sampling of the input information.

PO-1050
(5/69)

UNITED STATES PATENT OFFICE
CERTIFICATE OF CORRECTION

Patent No. 3,595,996 Dated July 27, 1971

Inventor(s) PETER J. UNGER

It is certified that error appears in the above-identified patent and that said Letters Patent are hereby corrected as shown below:

Col. 2, line 61, change "250" to -- +250 --

Col. 4, line 13, after "tube" insert -- in order to modulate the brightness of such monitor tube --

Col. 5, line 8, after "raster" insert a period.
line 12, after "signal" insert a period.
line 68, after "ramps" insert a period.

Col. 6, line 3, after "synchronously" insert a period.
line 6, after "lines" insert a period.
line 8, after "58" insert a period.
line 14, after "written" insert a period.
line 18, after " samples" insert --of equal size. In most instances, the samples --
line 60, after "84" insert a period.
line 62, after "Fig. 1" insert a period.
line 68, after "82" insert a period.

Col. 7, line 31, after "tion" insert a period.
line 33, after "thereof" insert a period.
line 34. After "I claim" insert a colon.
line 51, after "received" insert a period.
line 58, after "pattern" insert a period.

Col. 8, line 5, after "means" insert a period.
line 32, "means for receiving an input signal," should be a separate paragraph.

Signed and sealed this 10th day of October 1972.

(SEAL)
Attest:

EDWARD M.FLETCHER,JR.
Attesting Officer

ROBERT GOTTSCHALK
Commissioner of Patents